No. 850,774. PATENTED APR. 16, 1907.
B. MOORE.
AXLE BEARING.
APPLICATION FILED AUG. 15, 1906.

Witnesses
Frank B. Hoffman

Inventor
Benton Moore
By Victor J. Evans
Attorney

UNITED STATES PATENT OFFICE.

BENTON MOORE, OF CHERRYVALE, KANSAS.

AXLE-BEARING.

No. 850,774.  Specification of Letters Patent.  Patented April 16, 1907.

Application filed August 15, 1906. Serial No. 330,731.

*To all whom it may concern:*

Be it known that I, BENTON MOORE, a citizen of the United States of America, residing at Cherryvale, in the county of Montgomery and State of Kansas, have invented new and useful Improvements in Axle-Bearings, of which the following is a specification.

This invention relates to axle-bearings; and one of the principal objects of the same is to provide simple and convenient means for lubricating the bearing and to provide means for automatically closing the oil-holes through which the oil is introduced.

Another object of the invention is to provide means for holding the bearing rigidly to the axle in order that the wheel may be withdrawn from the bearing.

These and other objects are attained by means of the construction illustrated in the accompanying drawings, in which—

Figure 1:
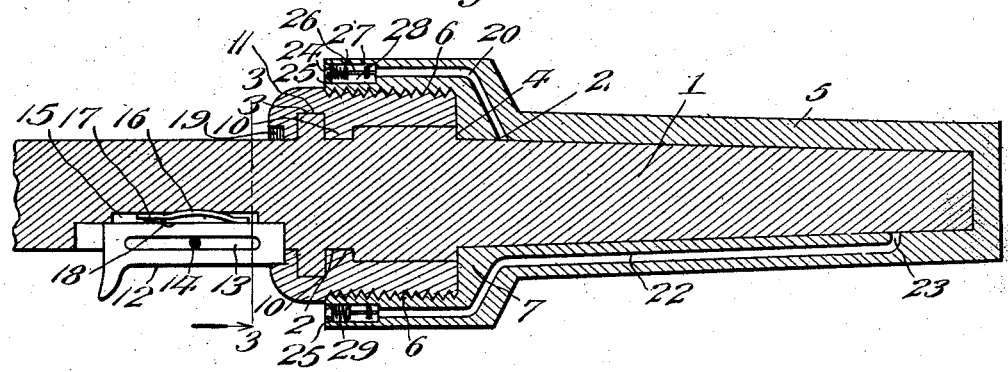
Figure 2:
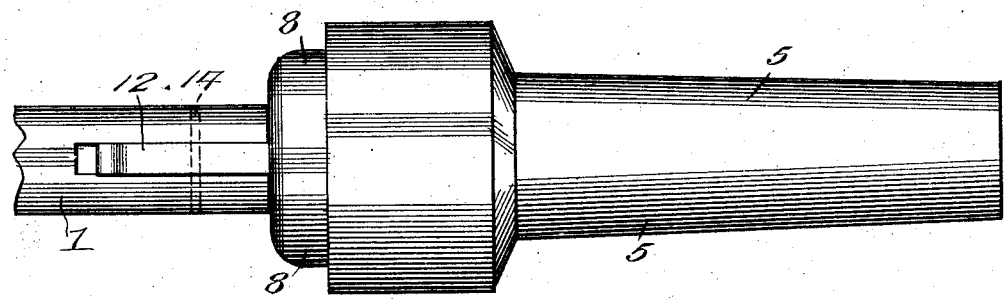
Figure 3:
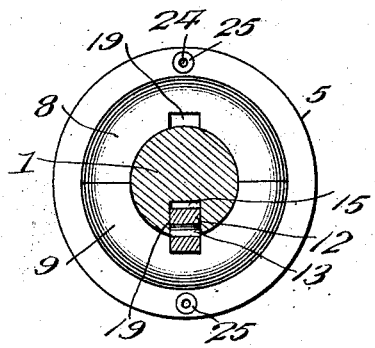

Figure 1 is a longitudinal section taken through the bearing and axle. Fig. 2 is an under side view of the same. Fig. 3 is a vertical section on the line 3 3 of Fig. 1.

Referring to the drawings for a more particular description of the invention, the numeral 1 designates an axle-spindle provided with an annular groove 2 and a flange 3 contiguous thereto. A shoulder 4 is also formed on said spindle for a purpose which will presently appear. The axle-box 5 has an interior bore adapted to fit the spindle 1, and the bore is enlarged at its inner end and interiorly screw-threaded, as at 6, a shoulder 7 being formed in said enlarged portion to bear against the shoulder 4 on the axle-spindle. Fitted within the threaded portion 6 is a sectional nut 8 9, said sections each having a semicircular flange 10 to fit the recess 2 in the spindle and a semi-annular groove 11 for the flange 3 on said spindle. Fitted to slide in the under surface of the axle is a bolt 12, said bolt having a slot 13 therein and a cross-pin 14, extending through the slot and through the axle to hold said sliding bolt in position. A recess 15 is formed in the axle, and seated in said recess is a curved spring 16, said spring having a rounded projection 17 thereon to engage a notch 18 in the upper surface of the bolt 12, said projection and notch being brought into coincidence when the bolt is moved toward the left in Fig. 1 to disengage said bolt from the socket 19 in the inner end of the sectional nut 8 9. The purpose of this bolt is to hold the nut and the box against rotation in order that the wheel, which is frictionally fitted to the box 5, may be removed by turning said wheel off the tapering end of the box.

An oil-duct 20 extends into the inner end of the box and terminates at a point within the enlarged portion thereof, as at 21, while a similar oil-duct 22 extends from the opposite side of said enlarged portion through the box toward its outer end and terminates at 23. The object of this arrangement of oil-ducts is to provide means whereby oil may be applied at two points upon the spindle.

To close the openings to the oil-ducts, I have provided spring-seated valves 24. These valves being identical in construction, one only may be described. The valve-seat 25 is secured within an opening in the inner end of the enlarged portion of the box and is provided with a conical seat for the valve 24. The valve-stem 26 is mounted to slide in collars 27, disposed in a recess 28, communicating with the oil-ducts, and a spring 29, bearing at one end against the collar 27 and at its opposite end against the valve 24, exerts its stress to seat the valve. Whenever it is required to introduce oil to the ducts 20 22, the outlet-tube of an oil-can is presented against the valve, and said valve is pushed inward, as will be understood.

To apply the wheel to the bearing, the sliding bolt is engaged with the nut, and the wheel is engaged with the box and rotated until the threads 6 engage the threaded portion of the sectional nut and until the wheel-hub frictionally engages the box to move therewith. The bolt is then withdrawn from its connection with the sectional nut and held in such retracted position by means of the projection upon the spring and the notch in the bolt. It will be understood that the threads upon the nut and the box are disposed oppositely to the rotation of the wheel, so that there will not be a tendency to withdraw the box from the nut by the rotation of the wheel.

From the foregoing it will be obvious that my axle-bearing is of a comparatively simple construction, is provided with means whereby the wheel may be quickly attached and detached from the axle, and that dust-proof oil-ducts are provided whereby the bearing may be oiled at two points within its length.

Having thus described the invention, what is claimed as new is—

An axle-bearing comprising a sectional nut fitted to the axle, an axle-box provided with a threaded portion to engage said nut, a sliding bolt mounted in said axle, and a spring having a projection to engage a notch in the bolt for holding the latter in retracted position, substantially as described.

In testimony whereof I affix my signature in presence of two witnesses.

BENTON MOORE.

Witnesses:
   BLANCHE VERMILLION,
   L. P. BROOKS.